United States Patent [19]
Rouillet et al.

[11] Patent Number: 4,896,338
[45] Date of Patent: Jan. 23, 1990

[54] METHOD AND DEVICE FOR THE DIGITAL SYNTHESIS OF A CLOCK SIGNAL

[75] Inventors: Andre Rouillet, Domont; Luc Dartois, Colombes, both of France

[73] Assignee: Thomson-CSF, Paris, France

[21] Appl. No.: 212,355

[22] Filed: Jun. 27, 1988

[30] Foreign Application Priority Data

Jun. 26, 1987 [FR] France .................................. 87 09029

[51] Int. Cl.[4] ............................................. H03D 3/24
[52] U.S. Cl. ..................................... 375/119; 375/118; 307/262
[58] Field of Search .................. 375/118, 119; 371/61; 307/262, 511, 516, 527, 528; 328/72, 74, 75, 155

[56] References Cited

U.S. PATENT DOCUMENTS

| 3,638,192 | 1/1972 | Rutherford et al. | 375/119 |
| 3,851,101 | 11/1974 | En et al. | 375/119 |
| 4,492,914 | 1/1985 | Hitomi | 323/313 |
| 4,493,094 | 1/1985 | Thomson | 307/511 |
| 4,617,679 | 10/1986 | Brooks | 307/262 |
| 4,740,999 | 4/1988 | Wagner | 375/119 |

FOREIGN PATENT DOCUMENTS

2592244  6/1987 France .

OTHER PUBLICATIONS

IBM Technical Disclosure Bulletin, vol. 17, No. 10, Mars 1975, p. 2981, New York, U.S.; F. E. Stuebner: "Clock Pulse Generator With Adjustment For Cycle Length".

IBM Technical Disclosure Bulletin, vol. 10, No. 3, about 1967, p. 235, New York, U.S.; H. Deutsch et al.: "Digitally Programmable Derived Clock".

Primary Examiner—Robert L. Griffin
Assistant Examiner—Stephen Chin
Attorney, Agent, or Firm—Cushman, Darby & Cushman

[57] ABSTRACT

According to the method, the clock signal is obtained from a phase increment datum $\Delta P$, representing the frequency to be synthesized. It consists in performing a binary number M modulo addition of each phase increment with the modulo M sum of the phase increments already totalized inside a phase accumulating device. After each overflow of capacity of the accumulator device, the remaining residual phase error $P_K$ is read in the accumulating device. Correlatively, $2Q$ clock signals with a period $T_c$, phase-shifted with respect to each other by $T_c/2Q$ are generated. A temporal error $\Delta t_K$ is computed by obtaining the ratio $P_K/\Delta P$ between the residual phase error $P_K$ and the phase increment $\Delta P$ per period $T_c$. Finally that clock signal for which the phase shift with respect to the computation clock signal is closest to the computed residual phase is selected.

12 Claims, 11 Drawing Sheets

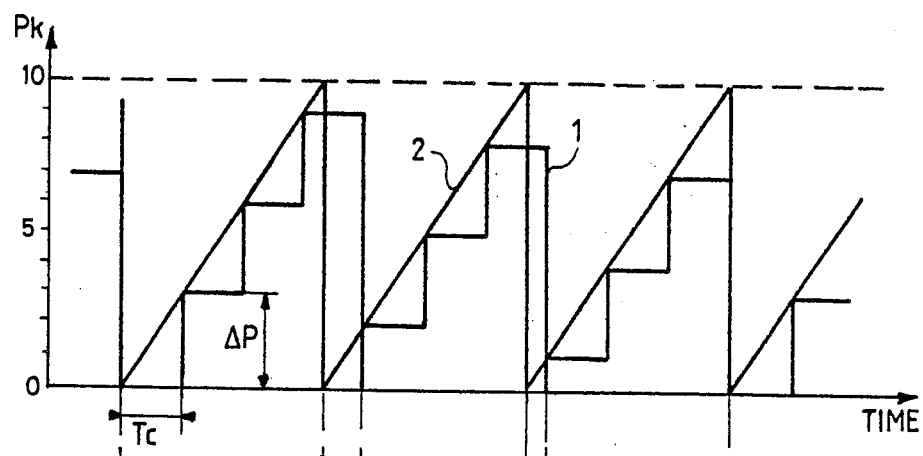
FIG_1-a
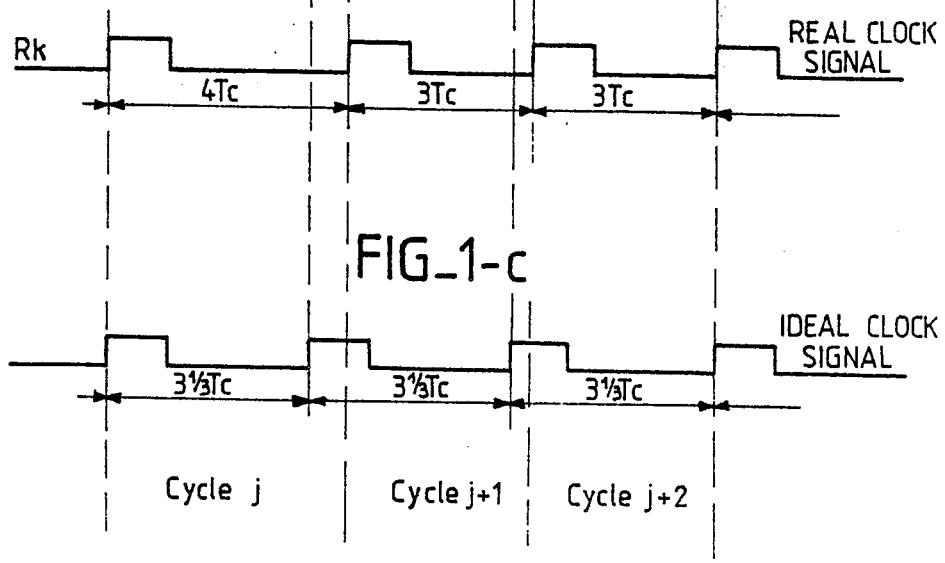
FIG_1-b
FIG_1-c

FIG_2-a
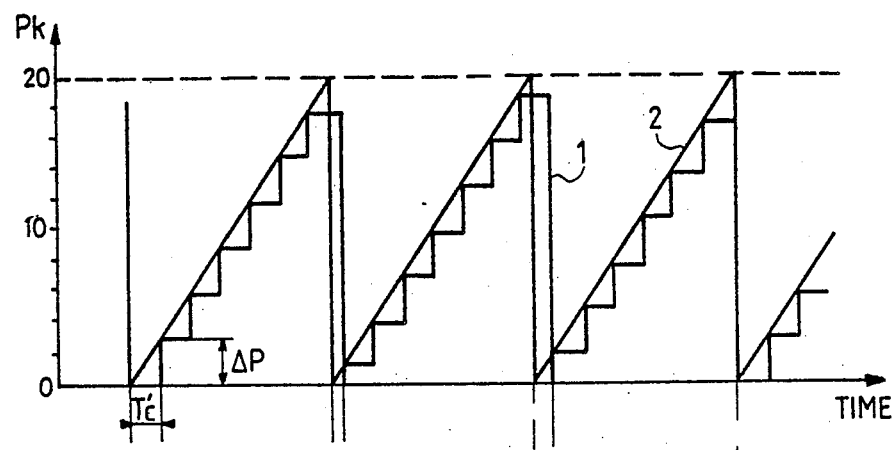
FIG_2-b
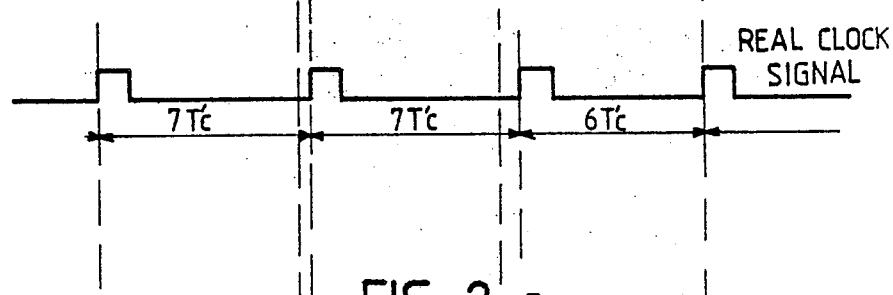
FIG_2-c
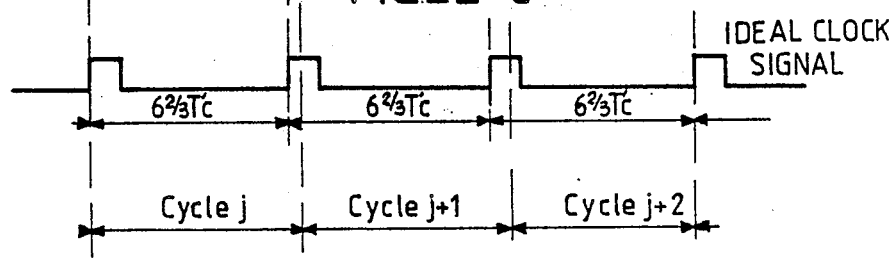

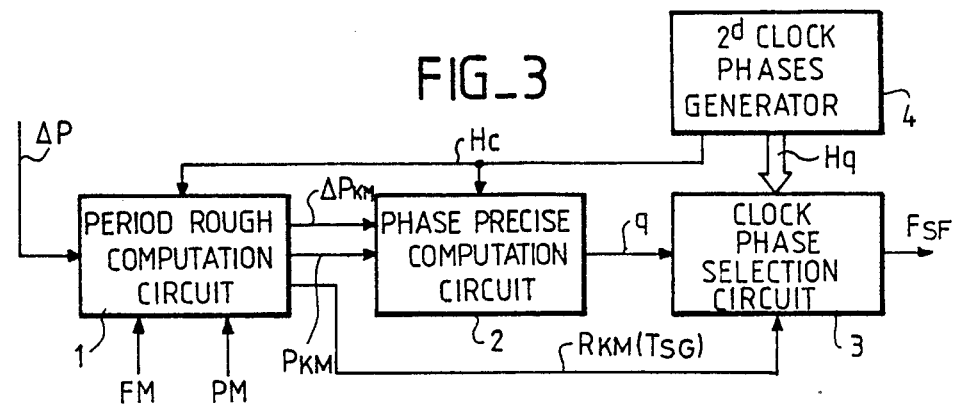
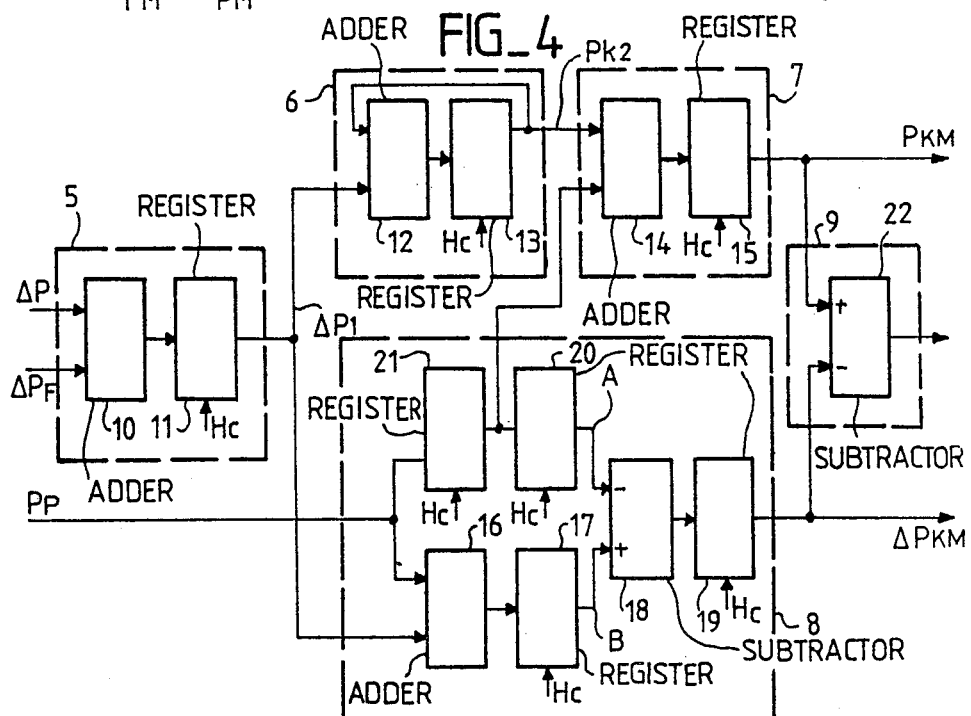

FIG_6-A
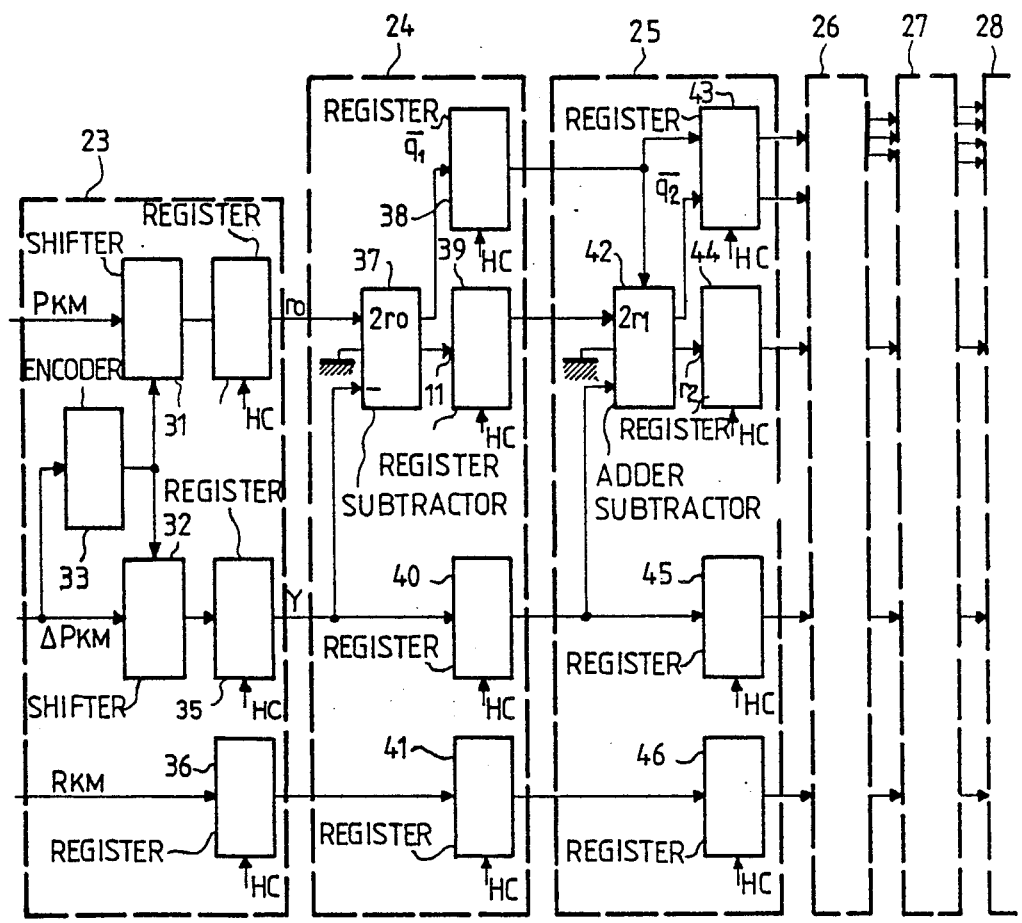

FIG_6-B
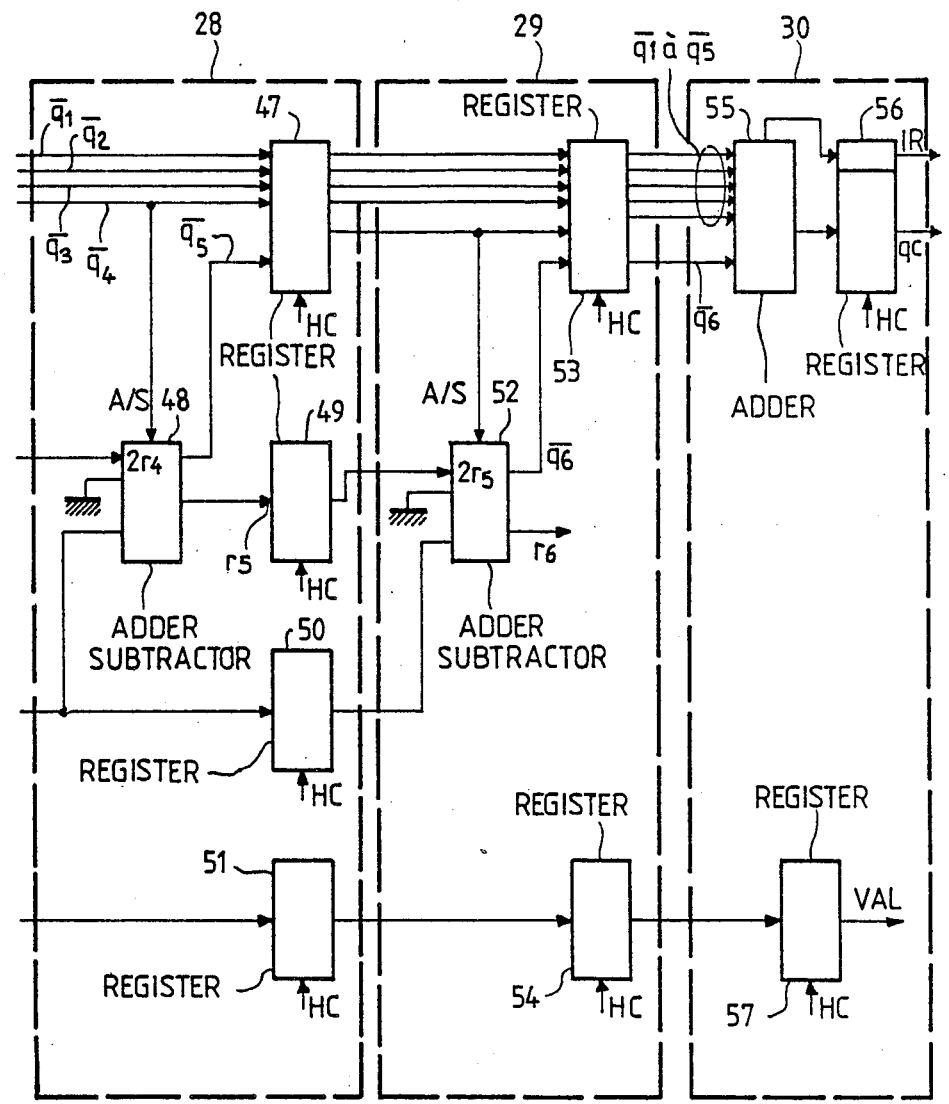

FIG_7

| | DEC | BIN | QUOTIENT Bit 1 2 3 4 5 6 |
|---|---|---|---|
| $r_0 = x$ | 118 | 0 0 1 1 1 0 1 1 0 | |
| $2r_0$ | 236 | 0 1 1 1 0 1 1 0 0 | |
| $r_1 = 2r_0 - Y$ | 103 | 0 0 1 1 0 0 1 1 1 | 1 |
| $2r_1$ | 206 | 0 1 1 0 0 1 1 1 0 | |
| $r_2 = 2r_1 - Y$ | 73 | 0 0 1 0 0 1 0 0 1 | 1 1 |
| $2r_2$ | 146 | 0 1 0 0 1 0 0 1 0 | |
| $r_3 = 2r_2 - Y$ | 13 | 0 0 0 0 0 1 1 0 1 | 1 1 1 |
| $2r_3$ | 26 | 0 0 0 0 1 1 0 1 0 | |
| $r_4 = 2r_3 - Y$ | -107 | 1 1 0 0 1 0 1 0 1 | 1 1 1 0 |
| $2r_4$ | -214 | 1 0 0 1 0 1 0 1 0 | |
| $r_5 = 2r_4 + Y$ | -81 | 1 1 0 1 0 1 1 1 1 | 1 1 1 0 0 |
| $2r_5$ | -162 | 1 0 1 0 1 1 1 1 0 | |
| $r_6 = 2r_5 + Y$ | -29 | 1 1 1 1 1 0 0 0 1 1 | 1 1 1 0 0 0 |

FIG_9

| K | PKM | R KM/VAL | $\frac{PKM}{\Delta PKM} 2^Q$ | qE | qC | IR |
|---|---|---|---|---|---|---|
| 1 | 0 | 0 | 0 | 0 | 0 | 1 |
| 2 | 5 | 0 | X | X | X | X |
| 3 | 2 | 1 | 3,2 | 3 | 5 | 0 |
| 4 | 7 | 0 | X | X | X | X |
| 5 | 4 | 1 | 6,4 | 6 | 2 | 0 |
| 6 | 1 | 1 | 1,6 | 2 | 6 | 0 |
| 7 | 6 | 0 | X | X | X | X |
| 8 | 3 | 1 | 4,8 | 5 | 3 | 0 |
| 9 | 0 | 1 | 0 | 0 | 0 | 1 |
| 10 | 5 | 0 | X | X | X | X |

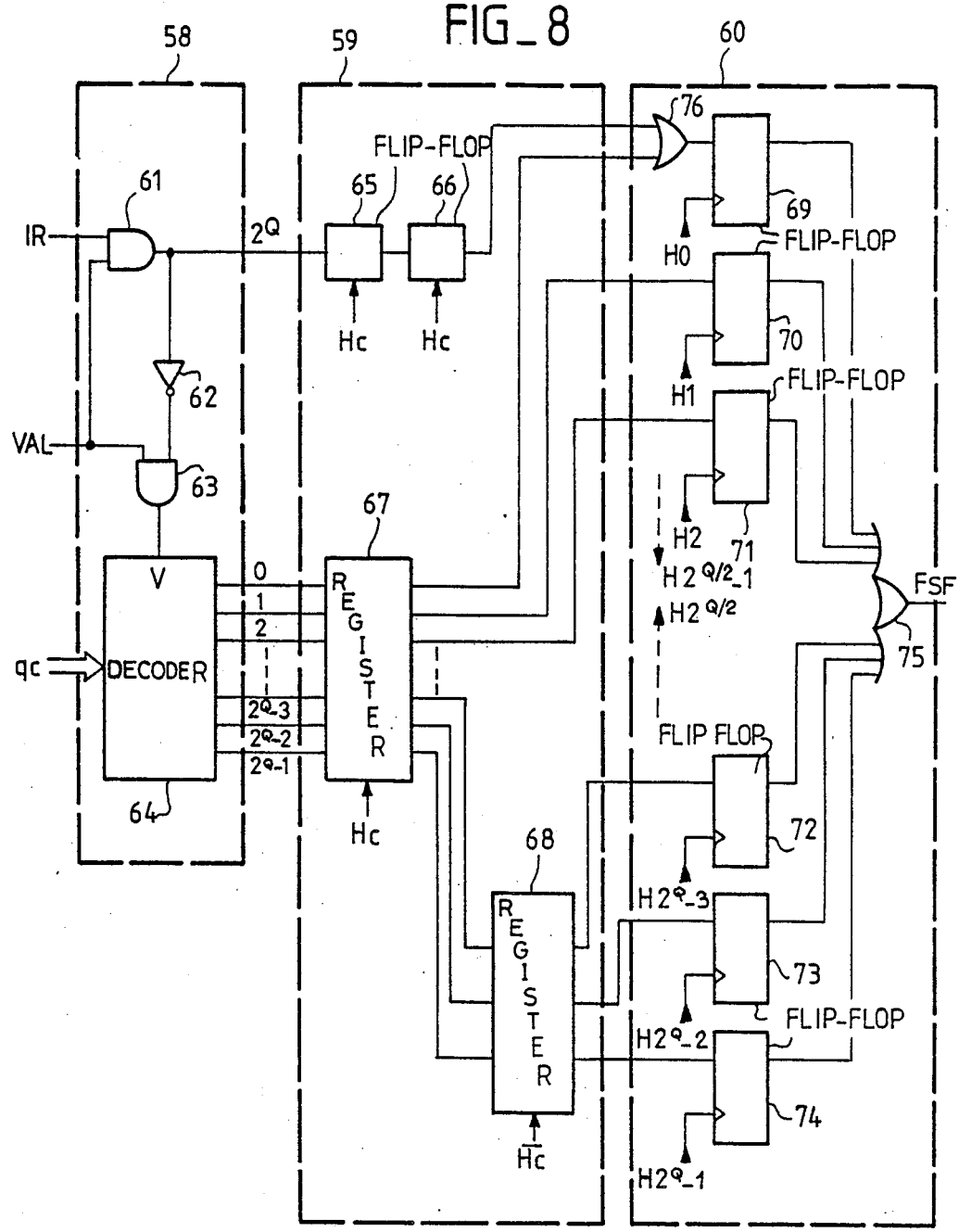
FIG_8

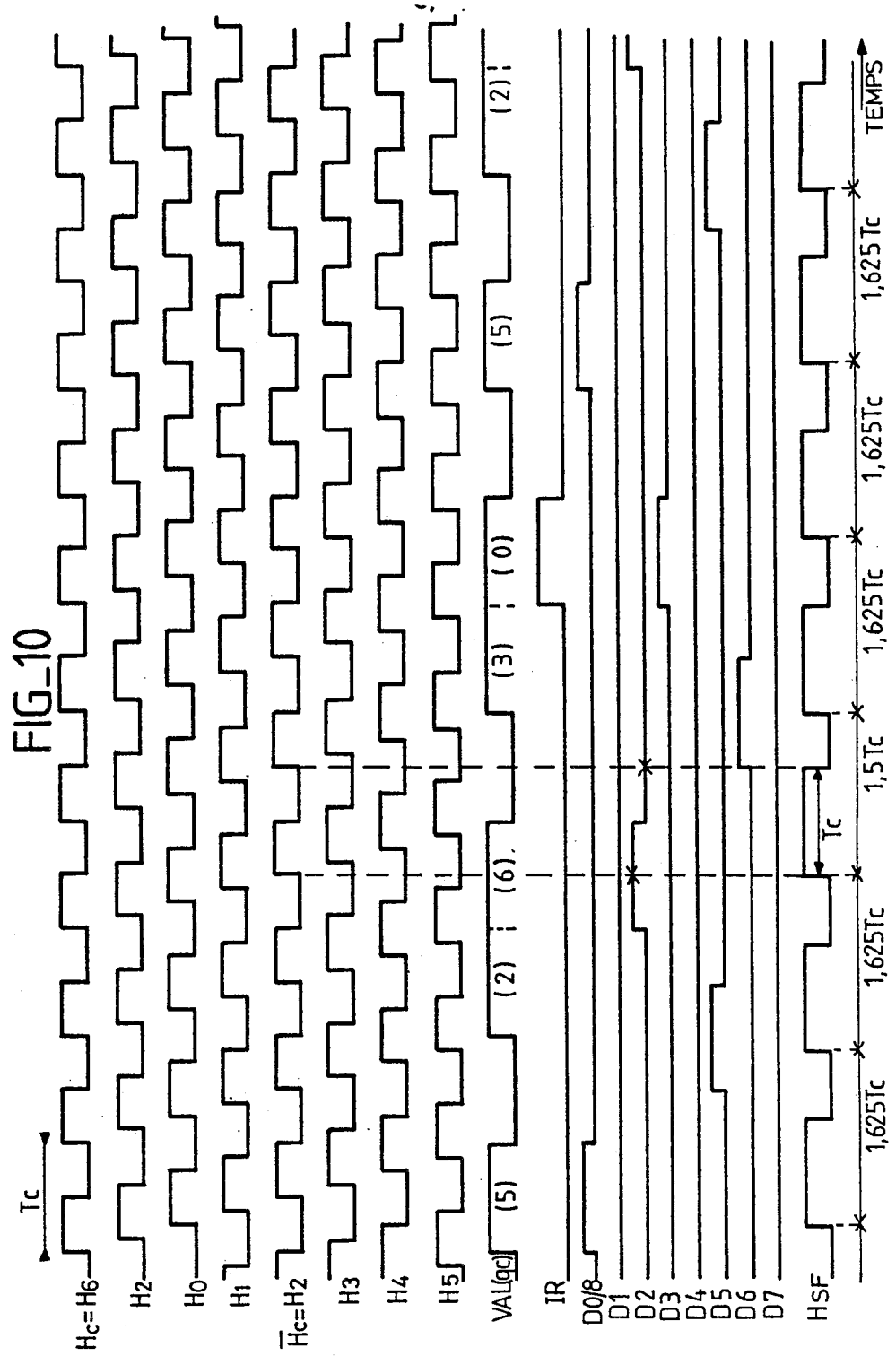
FIG_10

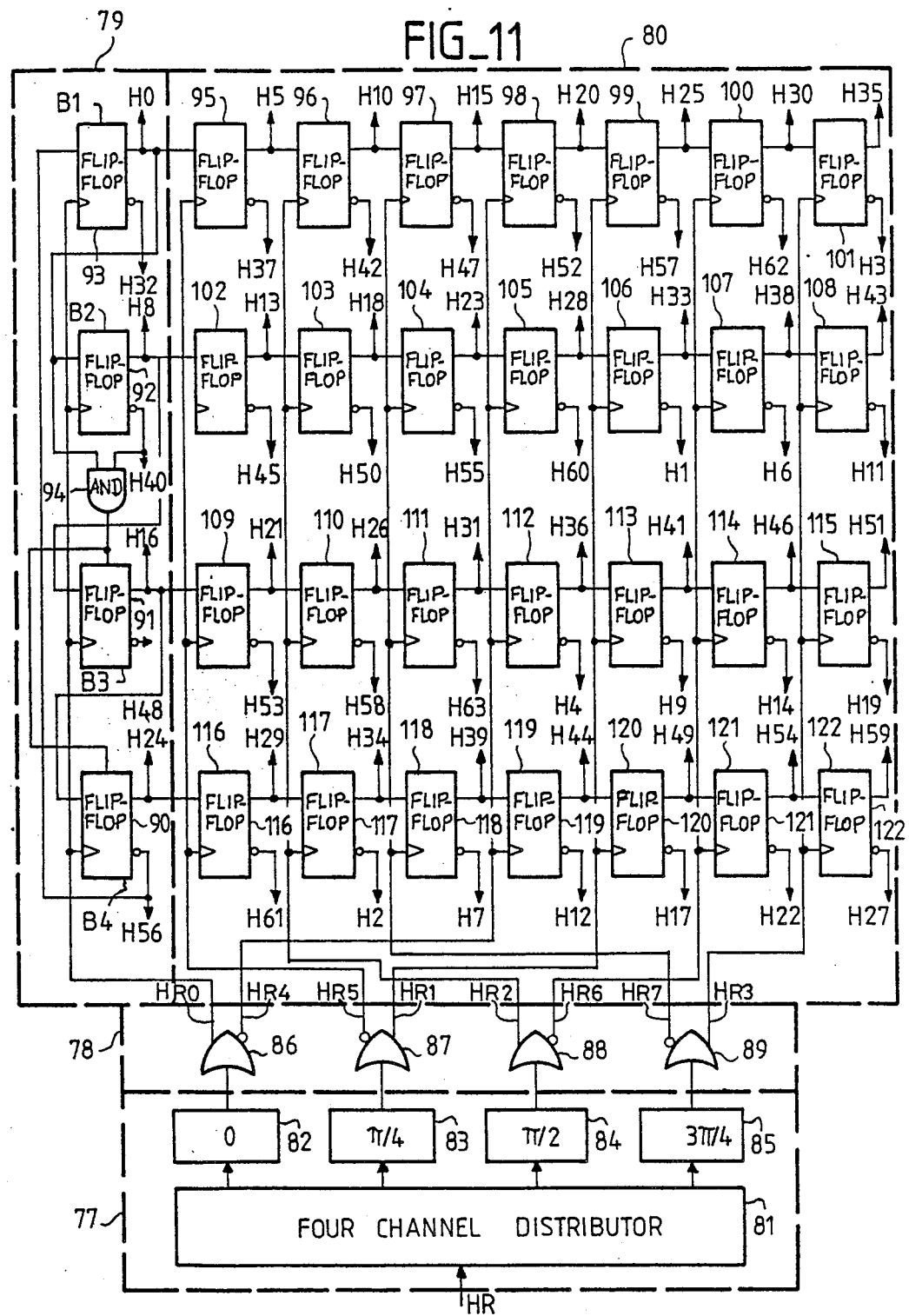

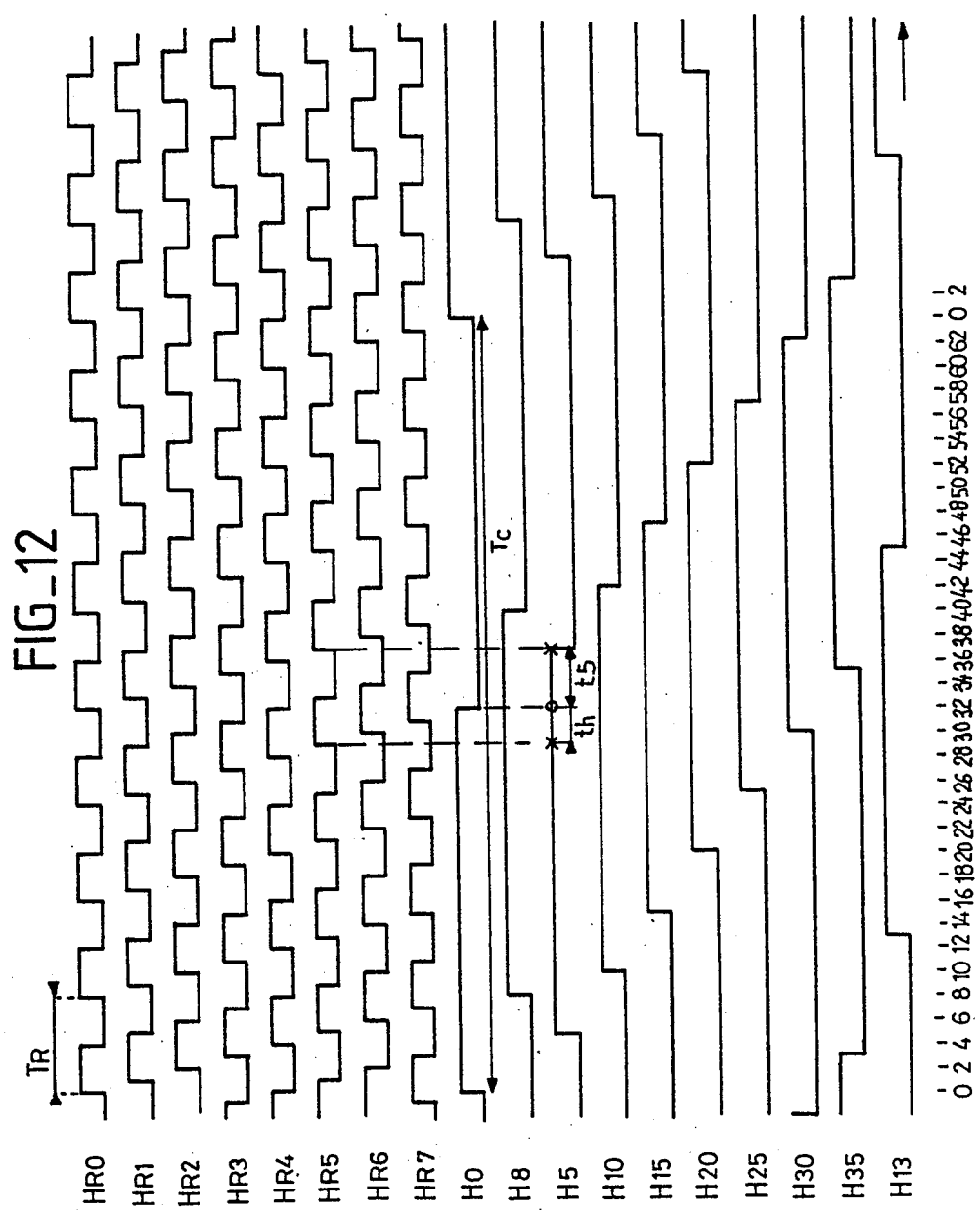
FIG_12

FIG_13

| PROCESSING GAIN dB | CLOCK NUMBERS OF PHASES | NUMBERS OF PRIMARY PHASES HR AND PHASE SHIFT | NUMBERS OF STAGES BY REGISTER INCLUDING THE DIVIDER | TIME RESOLUTION ns |
|---|---|---|---|---|
| 18 | 8 | 1(360°) | 1 | 2,50 |
| 24 | 16 | 2(180°) | 2 | 1,25 |
| 30 | 32 | 4(90°) | 4 | 0,63 |
| 36 | 64 | 8(45°) | 8 | 0,31 |
| 42 | 128 | 16(22,5) | 16 | 0,16 |
| 48 | 256 | 32(11,25) | 32 | 0,08 |

METHOD AND DEVICE FOR THE DIGITAL SYNTHESIS OF A CLOCK SIGNAL

BACKGROUND OF THE INVENTION

1. Field of the Invention

The present invention relates to a method and a device for the digital synthesis of a clock signal.

It applies to the making of clock signal generators for radio communications and, especially, to the construction of frequency hopping transmission systems where the frequency changes very swiftly in time by successive stages.

In systems of this type, the clock signals may be used as such or they may be copied by means of phase-lock loops to improve the remote noise characteristics through the filtering effect exerted by the loops. More generally, they can be used as reference clocks in one of the loops of a frequency synthesizer using a digital comparator of the phase/frequency type, for example in an addition loop, in order to enable its transposition in any range of frequencies.

In addition to the fact that these generators must have sound spectral quality while at the same time being capable of undergoing phase and frequency modulation, their use in terrestrial equipment or spacecraft, for example, means that they should consume little power and should occupy the smallest possible volume.

2. Description of the Prior Art

One known approach, which possesses the above characteristics to a great extent, lies in making a frequency synthesizer which entirely or partially consists of a direct digital synthesizer, namely a synthesizer that includes no phase-locking loop. According to this approach, the digital synthesizer is organized around an accumulating circuit or a sequential digital circuit, the content of which is increased by a determined quantity at each pulse of a signal given by a local clock. This circuit usually has an adder, the output of which is connected to a locking register controlled by a clock signal. The output of the locking register is looped to one of the inputs of the adder and the other input is the input of the accumulator. In a great many applications, and especially in those to which the invention relates, the accumulator is also called a "phase accumulator" because, in this case, the digital term $/P$, which is applied to its input constitutes a phase increment by one clock unit $T_c$ of the output signal. This term determines the speed of variation of the phase in time, namely, its frequency. The number of bits that can be memorized in the accumulator defines the capacity N of this accumulator. This capacity is equal to $M=2^N$ for binary encoding. Thus the adding operation performed at each clock signal front may be considered to be a modulo M adding operation of the type that verifies a relationship of the following form:

$$P_K = K.\Delta P \bmod M$$

(with $0 \leq \Delta P < M$
where K is the number of computation clock periods $T_c$ and $P_K$ is the binary number obtained at the output of the accumulator at the instant $t_K = K.T_c$ When the quantity $K.\Delta P$ is greater than or equal to M, a carry-over signal $R_K$ appears at the output of the adder for a time equal to the period $T_c$ of the clock signal. $P_K$ is then written at the overflow instant:

$$P_K = M - K.\Delta P < \Delta P \text{ and } R_K = 1$$

In principle, the value M corresponds exactly to a phase of $2\pi$ radians. Whenever there is an overflow of the accumulator, there is therefore a rotation of $2\pi$ radians, and the periodicity $T_s$ of the overflows verifies relationships of the following form:

$$T_s = (M/\Delta P).T_c$$

where $F_s = (\Delta P/M).F_c = T_s^{-1}$

However, these relationships are not totally verified unless the remainder of the Euclidian division of M by $\Delta P$ is nil and this is true only on an average in the other cases. For when M cannot be divided by $\Delta P$, the time $T'_s$ that elapses between two successive overflows is always a whole multiple of a clock period $T_c$ and fluctuates by one unit of $T_c$. This defines the degree of temporal precision with which the clock period $T_s$ can be obtained. Naturally, to increase the precision of the clock period $T_s$, the computation clock period $T_c$ must be reduced, but this approach quickly becomes impracticable because of the technological limitations of digital integrated circuits. Finally, a clock synthesized in this way always has a positional modulation of its rising edge in time. This may be represented in terms of a phase fluctuation or unwanted phase modulation with a peak-to-peak amplitude having a period of $T_c$ reduced to the period of the synthesized signal $T_s$. The modulation index m is then:

$$m = (\tfrac{1}{2}).(T_c/T_s).2\pi$$

For example, if $\pi$ is smaller than 0.3, the amplitudes of the unwanted lines obtained are given with good approximation by a first order Bessel function $J_1(m)$, that is $m/2$.

One procedure, enabling a substantial reduction in the phase fluctuation, is known from the French patent application No. FR 85 19067, filed on behalf of the Applicant and entitled "High Frequency Digital Synthesizer with Non-Periodic Correction Optimizing Spectral Speed". According to this approach, the accumulator is made, like a systolic system, so as to work at the highest possible frequency, and a temporal analog interpolation of the position of the output signal front is computed. This output is initialized by the instant at which a voltage gradient, triggered by the overflow of the accumulator, coincides with the output voltage of a digital/analog converter controlled by a time error datum resulting from prior computation. However, this approach requires the use of fast analog circuits in which the linearity is vital in order to obtain good results. This entails settings which complicate the use of this method.

SUMMARY OF THE INVENTION

An object of the invention is to remove the above-mentioned drawbacks.

For this purpose, an object of the invention is a method for the digital synthesis of a clock signal, of the type where the clock signal to be synthesized is obtained from a phase increment datum $\Delta P$, a method wherein, at each period $T_c$ of a computation clock signal, a binary number M modulo addition is done of each phase increment with the modulo M sum of the phase increments already totalized inside a phase accumulating device with a capacity equal to the binary number M, representing the frequency to be synthesized; after each overflow of the capacity of the accumulator device, the remaining residual phase error contained in the accumulating device is read; $2^Q$ clock signals with a period $T_c$, phase-shifted with respect to each other by $T_c/2^Q$ are generated; after each overflow the temporal error $\Delta t_K$ is computed by obtaining the ratio $P_K/\Delta P$ between the residual phase error $P_K$ and the phase increment $\Delta P$ per clock period $T_c$; and that clock signal is selected for which the phase shift with respect to the computation clock signal is closest to the computed residual phase.

Another object of the invention is a device to implement the said method.

Its main advantage is that it enables the synthesis of signals in baseband from the lowest frequencies up to the highest frequencies, of the order of 50 MHz to 80 MHz with current technology, with the ability to change over in less than one microsecond with possible frequency resolutions up to below one Hz, without requiring settings, owing to the entirely digital method used.

Another advantage of the invention is that it enables the making of circuits with very large scale integration of components using, for example, HCMOS technologies for frequencies below 80 MHz or, again, ECL technologies for frequencies between 300 and 500 MHz.

BRIEF DESCRIPTION OF THE DRAWINGS

Other features and advantages of the invention will appear below from the following description made with reference to the appended drawings, of which:

FIGS. 1a, 1b, 1c and 2a, 2b, 2c show timing diagrams illustrating the operation of direct digital synthesizers of the prior art, FIG. 3 shows an embodiment of a digital synthesizer according to the invention, FIG. 4 shows an embodiment of the rough computation circuit of the period of the circuit shown in FIG. 3, FIG. 5 is a table representing digital values at different points of the circuit of FIG. 4, FIGS. 6a and 6b show an embodiment of the precise phase computing circuit of the circuit shown in FIG. 3, FIG. 7 is a table showing the digital values obtained at different points of the circuits of FIGS. 6a and 6b, FIG. 8 shows an embodiment of the clock phase selection circuit shown in FIG. 3, FIG. 9 shows a table of results of computations obtained with the circuit of FIG. 8, FIG. 10 is a timing diagram showing how a low fluctuation clock signal is synthesized, FIG. 11 shows an embodiment of the phase shifted clock signals generating circuit of FIG. 3, FIG. 12 is a timing diagram to illustrate the operation of the circuit shown in FIG. 11, FIG. 13 is a table of characteristic parameters of an embodiment of the device according to the invention, in the case of a reference frequency of 400 MHz.

DESCRIPTION OF THE PREFERRED EMBODIMENT

Before entering into the description itself of the invention, an illustration of the phase fluctuation phenomenon, explained earlier with reference to prior art digital synthesizers, is given in FIGS. 1 and 2 so as to set the problem, which the invention seeks to resolve, in its right context. The graph shown in FIG. 1 corresponds to a digital example for which the capacity M of the accumulator is fixed at 10 and the phase variation /P is equal to 3. In this case, resuming the notations defined earlier, $P_K$ is in the sequence of the values 7, 0 , 3, 6, 9, 2, 5, 8, 1 , 4, 7, 0 , 3, 6, 9, 2 , etc. The underlined values give rise to an overflow $R_K$ of the adder, and thus successive vales are obtained of the period $T'_s$ of the real clock signal, such as $4T_c$, $3T_c$, $3T_c$, $4T_c$ etc.

Thus, on 10 computation clock periods, there are three overflows and, consequently, the mean value of the frequency is equal to:

, $F_s = 3/(4.T_c + 3.T_c + 3.T_c) = 0.3.F_c$

The results are shown in the timing diagrams of FIGS. 1a, 1b and 1c. In FIG. 1a, the sequence of values $P_K$ is represented by a stepped curve C1 in comparison with a curve C2 representing the ideal phase curve of the synthesized signal. FIGS. 1b and 1c respectively correspond to the curves C1 and C2, and give the position of the successive overflow signals $R_K$ in the real case of a phase accumulator and in the case of an ideally synthesized clock signal.

The temporal deviation between the real clock signal and the ideal clock signal is then at the cycles j, j+1 and j+2 of the real clock signal, respectively ($\frac{2}{3}$).$T_c$, ($\frac{1}{3}$).$T_c$ and 0. The real clock signal is always delayed or, at best, in phase with respect to the ideal clock signal, and its delay is proportionate to the content $P_K=2$, 1, 0 of the accumulator at the instant when the overflow appears.

In the example shown, the curve C1 is an approximation of the curve C2. The approximation is improved by increasing the number of phase computing points in the interval (0.2π). This is obtained especially by reducing the computation clock period, and by reducing the phase increment $\Delta P$, or again, in what amounts to the same thing, by increasing the capacity M of the accumulator.

FIGS. 2a, 2b, 2c show how the previous timing diagrams can develop for one and the same synthesized frequency. According to the cycles j, j+1 and j+2 shown, the temporal deviation between the real and ideal clock signals becomes ($\frac{1}{3}$).$T'_c$, ($\frac{2}{3}$).$T'_c$ and 0, but as $T'_c = T_c/2$, the definition of $T_s$ is improved in a ratio of 2.

As indicated above, the precision of the clock signal $T_s$ can be improved by reducing the computation clock period $T_c$. However, this improvement rapidly reaches a high frequency limit related to the reaction speed of the circuits used.

The invention described below with the help of FIGS. 3 to 13 provides remarkable improvement to prior art devices inasmuch as it enables a reduction of the phase fluctuation, in a constant ratio over an extended range of frequencies, by digital means.

The device according to the invention, shown in FIG. 3, has a circuit 1 for rough computation of the period of the signal of the circuit to be synthesized, a circuit 2 for precise phase computation, a circuit 3 to select the clock phase and a generator 4 of $2^Q$ clock phases. The first circuit 1 for rough computation of the period of the signal to be synthesized receives, at a first input, the computation clock signal $H_c$ given by the clock signals generator 4. At a second input, this circuit 1 receives the phase increment $\Delta P$, at a third input, it receives a frequency modulation signal FM, and at a fourth input it receives a phase modulation signal PM. The circuit 1 respectively gives, at three outputs, a phase increment value $\Delta P_{KM}$, a phase error value $P_{KM}$ and a signal $R_{KM}$ representing the pseudo-period $T_{SG}$ of the clock signal with a temporal precision at best equal to the period $T_c$ of the computation clock signal $H_c$. The phase error $P_{KM}$ and the signal $R_{KM}$ appear simultaneously at the output of the rough computation circuit 1 when $R_{KM}$ appears. The increment values $\Delta P_{KM}$ and $P_{KM}$ are respectively applied to a first and a second input of the precise phase computing circuit 2, a third input of this circuit receiving the computation clock signal $H_c$. The circuit 2 makes it possible, by taking into account the phase error $P_{KM}$ on the signal $T_{SG}$ and the ideal period given by the phase increment $\Delta P_{KM}$, to determine, within a time interval $T_C$ where $2^{Q+1}$ equidistant points are placed and numbered 0 to $2^Q$, the point that is closest to the temporal position of the ideal clock signal. This computation circuit consists, chiefly, as shall be described below, of a digital divider of the pipeline type, the stages work of which at the pace of the period $T_c$ computing clock signal. The result of the computation q is applied by the circuit 2, at a first input of the clock phase selection circuit 3. The circuit 3 also has a second input to which is applied the signal $R_{KM}$ given by the third output of the circuit 1 for the rough computation of the period and a third input to which is applied, through a bus $H_q$, $2^Q$ clock signals with a period equal to $T_c$, phase shifted with respect to each other by $2\pi/2^Q$ and given by the clock signals generator 4. The resulting number q given by the precision computing circuit 2 is validated by the accumulator overflow signal $R_{KM}$ inside the clock phase selection circuit 3.

A detailed depiction of the circuit 1 for the rough computation of the period 1 is shown in FIG. 4. It consists of five blocks marked 5 to 9 inside lines shown in dashes. The block 5 has an adder circuit 10 followed by a register 11. The adder performs the algebraic addition of the magnitudes $\Delta P$ and $\Delta P_F$ which define, by computation time unit, the phase increments $\Delta P$ of the signal to be synthesized $F_S$ and $\Delta P_F$ of the instantaneous frequency $\Delta F$ excursion when the signal $F_S$ is frequency modulated.

In practice $\Delta P$ and $\Delta P_F$ are two digital magnitudes, one of which, $\Delta P$, is fixed in time or fixed to a stage of a limited duration while the other magnitude $\Delta P_F$ varies according to the frequency modulation relationship to be obtained, and the relationship:

$$, 0 \leq |\Delta P_F| < \Delta P < M$$

is always verified. If N is the maximum number of bits defining $\Delta P$, then M is defined by $M = 2^N$. The register 11 takes into account the result of the computation obtained at the output of the adder circuit 10 at each rising edge of the computation clock signal $H_c$.

The block 6 which constitutes the phase accumulator performs the digital integration of the M modulo input signal. It has an adder circuit 12 and an accumulating register 13 to take into account the result of the computation given by the adder circuit 12 at each clock signal $H_c$ instant. The adder circuit 12 is connected by a first operand input to the output of the register 11 of the block 5 and, by a second operand input, to the output of the register 13. The block 5 transforms the phase increment input datum $\Delta P_1$ per time unit given by the register 11 into a phase datum $P_{K2}$ at the output of the register 13. The block 6 works on a dimension of N bits.

The block 7 enables the computation of the phase error $P_{KM}$, said computation being done by M modulo addition of the phase modulation $P_p$ to the phase information $P_{K2}$ coming from the block 6. It consists of an adder circuit 14 followed by a register 15 which takes into account the computation results given by the adder circuit 14 at each clock signal $H_c$ instant. A first operand input of the adder circuit 14 is directly connected to the output of the register 13. The phase modulation $P_p$ is applied to the second operand input of the adder circuit 14 through the block 8. The register 15 synchronizes data. In this assembly, the sign bit is not transmitted since we are concerned here only with the modulo $2\pi$ phase of the signal, namely with the digital value of the phase error $P_{KM}$ modulo M of the modulated signal. The input digital magnitude $P_p$ represents the instantaneous amplitude of the phase modulation. It is variable in time, and its variation depends on the modulation relationship. $P_p$ meets the relationship: $0 \leq |P_p| \leq M$.

In the same way as in frequency modulation, it will be assumed that the frequency of the modulating signal is substantially lower than the frequency of the non-modulated signal to be synthesized.

However, the introduction of the phase modulation brings out an ambiguity in the determining of the data $R_{KM}$ and $\Delta P_{KM}$.

For the output data $P_{KM}$ from the block 7 results from the algebraic addition of the magnitudes $P_p$ and $P_{K2}$. In giving, for example to $P_{K2}$, the sequence of values 0, 3, 6, 9, 2, 5, 8, 1, etc. and in assuming, for example, that $P_p = 6$, a sequence of values is obtained for $P_{KM} = 6, 9, 2$, $\underline{5}, 8, 1, 4, \underline{7}$ etc. where the underlined values indicate the existence of a carried-over value. It is therefore not possible to take this for the information $R_{KM}$ since it appears twice in succession. This difficulty can be overcome by taking the differences between the successive values of the error $P_{KM}$, namely in again taking the values of $P_{KM}$ given as an example (9−6), (2−9), (5−2), (8−5), (1−8), (4−1), (7−4)... etc. and in taking the sign of the difference as the value of $R_{KM}$. If the difference is negative, it is because the phase has exceeded the capacity M of the accumulator and because $R_{KM} = 1$. If not, if the difference is positive, $R_{KM}$ is equal to 0.

The information $\Delta P_{KM}$ giving the phase increment value can be taken at the output of the block 5 but, in this case, the value obtained will be independent of the phase modulation $P_p$. This may be of no importance if the phase modulation $P_p$ retains a constant value or zero value during time. If not, on the contrary, since the variations in the phase modulation $P_p$ modify the variation slope of the error $P_{KM}$ at the output of the block 7, they should be taken into account on the same basis as the values $\Delta P$ and $\Delta P_F$ in the assessment of the phase increment $\Delta P_{KM}$, which entails going beyond the capacity M of the adder circuit 14 and the obtaining of the datum $R_{KM} = 1$.

To take these parameters into account, the datum $\Delta P_{KM}$ is obtained by means of the block 8 which gives the difference between two successive values of $P_p$ at the value $\Delta P_1$ coming from the block 5. The block 8 includes the elements marked 16 to 21. An adder circuit 16 followed by a flip-flop register 17 does the addition between the most recent information of $P_p$ and the value $\Delta P_1$ given by the block 5. A subtractor circuit 18, followed by a register 19 obtains the difference between the preceding result got at the output of the register 17 and the immediately previous value of $P_p$ given at the output of a register 20. The register 20 receives the phase modulation $P_p$ through a register 21. The computations are performed on lengths of $N+1$ bits + 1 sign bit. The result $\Delta P_{KM}$ obtained is always positive by definition since the synthesized frequency cannot become negative. Finally, the block 9 has a subtractor circuit 22 coupled by a first operand input to the output of the register 15 of the block 7 and by its second operand input to the output of the register 19 of the block 8. The subtractor circuit 22 gives the information $R_{KM}$ which, for a reason of convenience, is none other than the value of the sign of the difference between the output of the block 7, giving the phase error $P_{KM}$, and the output of the block 8 giving, through the register 19, the phase increment $P_{KM}$. This operation leads to the same result as the one described earlier, wherein the differences obtained between two successives values $P_{KM}$ was taken. However, it appears more usable in the sense that when $R_{KM}$ is equal to 1, it is known that there has been an overflow of capacity because of the modulo M addition and because the result $P_{KM}$ is necessarily smaller than the increment $\Delta P_{KM}$ which has given rise to it.

Digital results obtained for various values of K at different points of the circuit shown in FIG. 4 are set according to the table of FIG. 5.

The details of the embodiment of the precise phase computation circuit are shown in FIG. 6A and 6B. This circuit comprises, shown inside dashes, computation blocks marked 23 to 30. It corresponds to an embodiment used to perform computations on 8-bit lengths. Its function is to convert the phase error $P_{KM}$ into a temporal error by taking into account the frequency of the signal to be synthesized. It gives the device of the invention the very important characteristic of phase non-periodicity required to reduce the phase fluctuation of the output signal. Finally, it can decode the temporal error obtained in the form of an address to control the clock phase selection circuit 3.

The phase error $P_{KM}$ is converted into a temporal error by computing the ratio of the phase error $P_{KM}$ with the phase increment $\Delta P_{KM}$ per time unit, defined herein by the period $P_c$ of the computation clock signal. We thus obtain a phase error $P_{KM}$ which is converted into a temporal error $\Delta T_{KM}$ such that:

$$\Delta t_{KM} = (P_{KM}/\Delta P_{KM}) \cdot T_c$$

By dividing the time unit $T_c$ into $2^Q$ equal parts, the temporal error is shown at best by the X-axis $q_E =$ rounded $((P_{KM}/\Delta P_{KM}) \cdot 2^Q)$ As a digital example, if $Q=5$, $P_{KM}=2$ and $\Delta P_{KM}=3$, the best abscissa $q_E$ representing the temporal error is:

$$q_E = \text{rounded } ((2/3) \cdot 32) = 21.$$

when $P_{KM}=0$, the X-axis is nil, there is no error, and the temporal position of the information $R_{KM}$ is identified with the ideal position of the signal sought.

Since the real signal is delayed with respect to the ideal signal, it is therefore necessary to make a temporal correction equivalent to an abscissa of $-11$. Since this cannot be done physically (negative time) an additional calibrated delay equal to $T_c$ is introduced. Since $T_c$ is equivalent to $2^Q$ and equals 32 in the present example, it becomes necessary to make an abscissa correction equal to:

$$q_c = 2^Q - q_E = 2^Q - \text{rounded } ((P_{KM}/\Delta P_{KM} \cdot 2^Q))$$

namely, in the example, $Q_c = 32 - 21 = 11$.

Thus, the time error $\Delta t_{KM}$ results from the division of two positive binary numbers, the dividend being the phase error $P_{KM}$ and the divider being the increment $\Delta P_{KM}$ with:

$$0 \leq P_{KM} < \Delta P_{KM}$$

This division can be done by applying the known division algorithms some of which can be found, for example, in the work by Y. Chu, "Digital Computer Design Fundamentals" published by McGraw-Hill.

The number of bits that the quotient should have is equal to $Q+1$ to enable to rounding out to be done. The quotient is then multiplied by a power of 2, by simply shifting, in a leftward shifting operation, the Q bits in a shift register. To perform the rounding out operation, the value of the Q bits located to the left of the decimal point is taken and the bit remaining to the right of this decimal point is added to it. If the bit equals zero, the decimal value may range between x.o and x.499, and the rounded out value is x. If this bit equals 1, the decimal value ranges between x.5 and x.999, and the rounded out value is x+1.

Designating the divider and the dividend by Y and X respectively, the division can be done by adding or subtracting the divider Y to or from the partial remainder $r_i$ according to the signs of the divider and from the partial remainder. If both signs are identical, a subtraction is done, and the quotient bit is equal to 1. This subtraction may also be replaced by an addition of the two's complement of the divider. On the contrary, if the signs of the divider and of the partial remainder are different, an addition is performed and the quotient bit is equal to zero. Under all circumstances, a new partial remainder is determined by shifting one bit leftwards and the process is continued until the desired number of quotient bits is obtained. In the present case, since the divider is always positive, the partial remainder sign bit is the complement of the bit of the quotient By definition, the initial remainder $r_0$ is the dividend X and the first partial remainder is written:

$$r_1 = 2r_0 - Y$$

If the signs of $r_1$ and Y are identical, the first bit $q_1$ of the quotient is equal to 1 and a subtraction is performed. In the reverse case, the bit of the quotient is zero and an addition is done.

The second partial remainder is then written as follows:

$$r_2 = 2r_1 + (1 - 2Q_1) \cdot Y$$

The process is thus repeated until the $Q+1$ bits of the quotient are obtained.

Taking as a digital computing example, a value $P_{KM} = 1901$ and a value $\Delta P_{KM} = 2135$, where $P_{KM}$ and $\Delta P_{KM}$ respectively represent the dividend and divider, and taking $Q=5$, we get $q_E = 28$ (non-rounded value 28.493).

In this case, the quotient is computed on six bits and, to obtain adequate precision, two additional bits are used to define the divider and the dividend. The table shown in FIG. 7 represents the sequence of operations. In binary mode 2135 is written on 12 bits 100001010111 and, consequently, Y is written on 8 bits Y=0.10000101 which represents 133 in decimal notation and $-Y = 1.01111011$.

Similarly, 1901 is written as 011101101101 whence X=0.0111011 which represents 118 in decimal notation.

In the binary representation of the numbers X and Y, the bit located to the left of the decimal point corresponds to the sign bit. It is noted in the table of FIG. 7 that the bit 6 of the quotient is equal to zero at the end of the computation and that the rounded value $q_E$ of the quotient is equal to 28.

The above example shows that to obtain a quotient of six bits, the number of repetitive operations, leftward shifts, subtractions or additions and memorizations of the quotient bit is six and that, at best, this can be done in six clock periods. However, the need to compute the abscissa $q_c$ correction value may appear frequently, for example at every two clock periods $T_c$ when synthesizing a clock signal with a frequency which is half the computation frequency. In this case, a pipeline type of structure could be chosen for the divider circuit comprising as many bits as there are stages to be computed, said stages all operating at the same computation clock signal $H_c$. The embodiment shown in FIGS. 6A and 6B works on this principle. It gives, on the basis of the data $P_{KM}$, $\Delta P_{KM}$ and $R_{KM}$, the abscissa $q_c$ correction validated by the signal $R_{KM}$.

The block 23 is used to adjust the format of the data $P_{KM}$ and $\Delta P_{KM}$ to the capacity of the divider so as to obtain always the same maximum precision regardless of the value $\Delta P_{KM}$. For this, it has two bit-shifting circuits 31 and 32, made with ECL technology of a known type, for example, circuits with the reference 100158 made by FAIRCHILD. At the inputs of these circuits are respectively applied the phase error $P_{KM}$ and the phase increment $\Delta P_{KM}$. The amplitude of the shift is controlled by a shift data encoder 33 addressed by the phase increment $\Delta P_{KM}$. The shift circuits 31 and 32 consist of combinatorial logic circuits comprising a set of gates controlled by instructions given by the encoder 33 enabling a leftward shift of any word of a determined number of bits. The shifting information is given by the position of the most significant bit of the word $\Delta P_{KM}$. If the phase increment $\Delta P_{KM}$ comprises a maximum of M bits and if the amplitude of these variations covers a ratio of $2^4$, namely 4 octaves, towards the lower values, the simultaneous shift of the data in $\Delta P_{KM}$ and $P_{KM}$ will vary from 0 to 4 bits towards the left.

To eliminate dispersals in the propagation time and ensure the temporal coherence of the three items of information $\Delta P_{KM}$, $P_{KM} R_{KM}$, a sampling by the computation clock signal $H_c$ is done after each arithmetical operation on all these three items of information within each block 23 to 30.

At the output of the block 23, the items of information $P_{KM}$ and $\Delta P_{KM}$ are respectively converted by the shifting circuits 31 and 32 into two items of information $r_0$ and Y. The blocks 24 to 29 shown constitute the pipeline divider proper and work according to the above described algorithm. The block 24 constitutes the initial division block. The first arithmetical element consists of a subtractor circuit 37 which receives, at its "+" input, the term $r_0$ shifted leftward by one bit, i.e. multiplied by 2 and marked $2r_O$ in the FIGS. 6A and 6B and it receives the term Y at the "−" input. It must be noted, however, that the subtraction done at this level may be replaced by an addition, taking the complement to 1 of the subtracted term and adding 1 to the input of the carry-over input of an adder. The sign output of the subtractor circuit 37 is the complement of the first bit of the quotient marked $q_1$ and the mantissa is $r_1$. These two magnitudes are respectively taken into account inside the registers 38 and 39. Registers 40 and 41 are used to respectively memorize the item of information Y and the item of information $R_{KM}$ coming from the registers 35 and 36.

The blocks 25 to 28 are intermediate division blocks used to obtain successively the bits of the quotients $\overline{q_2}$ to $\overline{q_5}$, the size of the memorizing register each intermediate quotient increasing by one unit at each block so as to become adapted to the number of digits of the computed quotient. The addition or subtraction command of the arithmetic element of a block marked A/S in FIGS. 6A and 6B is given by the resulting output of the preceding computation since the piece of information Y is always positive. If the sign of a partial remainder $r_n$ is positive then the corresponding bit $\overline{q_n}=0$ and the operation is an addition. If not, if the sign $r_n$ is negative, then $\overline{q_n}=1$ and the operation is a subtraction. In FIGS. 6A and 6B, the blocks 25 and 26, 27 and 28 consist of identical elements, the elements 42 to 46 being respectively equivalent to the elements 47 to 51 of the block 28, these elements themselves being respectively equivalent to the elements 37 to 41 of the block 24.

The block 29 constitutes the final division block. This block is simplified with respect to the previous block through the elimination of the storage register for memorizing the remainder and the register for memorizing the value Y since the division is completed. Finally, the block 30 has an adder circuit 55 coupled at the output to a register 56 and a register 57 coupled to the register 54 of the block 29. The block 30 processes the rounded-out value of the quotient and gives the abscissa correction value $q_c$. The value of the abscissa correction $q_c$ is got by adding the last bit $\overline{q_6}$ (the least significant bit) in the adder 55 to the binary word consisting of the bits $\overline{q_1}$ to $\overline{q_5}$ where $\overline{q_1}$ is the most significant bit.

As defined earlier, the value $q_c$ is equal to $2Q\text{-}q_E$. If the bits $\overline{q_1}$ to $\overline{q_6}$ are equal to 0, then $q_c$ is equal to 0 and there is no correction to be made since the error $q_E$ is maximum and is equal to $2Q$. In another example, if all the bits $\overline{q_1}$ to $\overline{q_6}$ are equal to 1, then $q_c$ is still equal to 0 but, unlike the above example, the error $q_E$ is zero and $q_c$ must then be considered as taking the value $2Q$.

The correction value $2Q$ is obtained by introducing an additional delay equal to $T_c$ in the clock phase selection circuit. The carry-over given by the adder circuit 5 is used, in these circumstances, as an indicator IR when $q_c$ is equal to $2Q$: IR being a bit with a significance of $2Q+1$. Finally, the register 7 gives a computation validating signal VAL which is none other than an overflow indicator $R_{KM}$ deferred for as many times as there are synchronous operations performed to obtain the value of $q_c$ in FIGS. 6A and 6B which, in the example, is equal to 8 times.

The clock phase selection circuit is shown in FIG. 8 and comprises three blocks respectively marked 58, 59 and 60 inside broken lines. The block 58 has a set of logic gates 61 to 63 and a circuit 64 for decoding the binary encoded signal $q_c$ computed earlier.

The block 59 consists of the registers 65, 66, 67 and of the register 68. Finally, the block 60 has a set of $2Q$ flip-flops, of which only the flip-flops marked 69 to 74 are shown. These flip-flops are connected by their outputs to an OR gate 75. The input of the flip-flop 69 is controlled through an OR gate 76 to two inputs, a first input of the OR gate 76 being connected to the output of the flip-flop 66 and a second input of the OR gate 76 being connected to the output of the register 67 which corresponds to the zero decimal value of the term $q_c$.

The clock phase selection circuit works as follows. The binary encoded term $q_c$ (correction abscissa) is decoded by the decoder 64 in one among $2^Q$. The $2^Q$ separate lines are used as clock phase selection addresses and these addresses are validated only when the signal VAL, given by the register 57 of the block 30 of FIGS. 6A and 6B, is present at a first input of the AND gate 63. Each address is present for a duration equal to a clock period $H_c$. It is read by means of $2^Q$ "D" type flip-flops, only the flip-flops 69 to 74 being shown inside the clock 60. They are controlled by the phase-shifted clock corresponding to this address. The outputs of the flip-flops 69 to 74 are applied to the corresponding inputs of the OR gate 75 which combines all the signals on one and the same line. The resulting signal obtained at the OR gate 75 is the precisely defined synthesized clock signal with a period $T_{SF}$.

An illustration of the operation of the selection circuit in a precise example of use is explained below by means of the table of FIG. 9. It is assumed in this example that the accumulator has a capacity of M=8, that the phase increment $\Delta P=5$ and that no phase modulation or frequency modulation is applied to the device. The results are those that would obtained with a value of Q=3. The cross X indicates that the computations are not taken into account when the signal VAL=0. In this table, five overflow values $R_{Km}$ per cycle of eight computation clock periods are obtained. These overflow values roughly represent the clock signal synthesized by the phase accumulator alone and its period $T_{SG}$ is equal to either $T_c$ or twice $T_c$ which is quite imprecise while the ideal clock signal should be equal to $8T_c/5$ giving 1.6 $T_c$.

The data $q_C$, IR and VAL are those given to the selection circuit described above with reference to FIG. 8. In the block 58, the encoded binary signal $q_c$, which represents the correction abscissa, is decoded by the decoder 64 in $2^Q$ separate items of information given on $2^Q$ connections. Since the dividing circuit works permanently in the precise computation circuit, the only valid operations are those performed when the signals $R_{KM}$ or VAL are at the level 1. The signal VAL is used to validate, firstly, the decoding of $q_c$ and, secondly, the carried-over information IR given by the register 56 of the block 30 of FIG. 6A and 6B. If the signals IR and VAL have a value 1, then $q_c$ is necessarily equal to 0 and if there is to be no confusion between the state O and the state $2^Q$, the decoder 64 is invalidated by the action of the gate 63. The block 58 gives an output on $2^Q+1$ address lines numbered 0 to $2^Q$. The block 59 can be used to obtain appropriate delays in the address signals so that the clock phases can be selected accurately in the block 60.

A first register 67 is used to synchronize the outputs of the decoder by the clock signal $H_c$. The outputs of the register 67 are divided into two groups of equal sizes: one group comprising the addresses numbered 0 to $2^{Q/2}-1$ is applied directly to the Q/2 first flip-flops of the block 60 while the other comprising the addresses $2^{Q/2}$ to $2^Q-1$ is firstly deferred by a half computation clock period $T_c$ by means of the register 68 which is controlled by the clock signal complementary to the clock signal $H_c$ before being applied to the Q/2 last flip-flops of the block 60.

As regards the address $2^Q$, once it is synchronized by the clock signal $H_c$ by means of the flip-flop 65, this flip-flop is deferred by the flip-flop 66 by a clock period $T_c$ for the reason already indicated in the description of the precise computing circuit.

The flip-flops 69 to 74 form $2^Q$ identical flip-flops each receiving a clock $H_0$ to $H_{2^Q-1}$. These $2^Q$ clock signals are phase shifted with respect to each other by $2\bar{n}/2^Q$rad and are given by the clock generator 4 of FIG. 3. The inputs of these flip-flops receive the addresses which are present during a computing period $T_c$. For example, if the address 2 exists, then its sampling by the clock $H_2$ will give, at the output of the flip-flop 71, only one positive peak with a duration $T_c$ with, however, a phase corresponding to that of the clock signal $H_2$. The outputs of the flip-flops 69 to 74 are applied to the corresponding inputs of the OR circuit 75 with $2_Q$ inputs so as to obtain a sequence of successive and fairly evenly spaced out peaks which constitute the low fluctuation clock signal sought with a period $T_{SF}$.

With respect to the flip-flop 69 which receives the clock signal $H_O$, the data applied to its input is, according to the result of the precise computation, either the address 0 given by the decoder 64 or the address $2^Q$ given by the data IR. Since these two signals cannot exist simultaneously, the OR gate 76 provides the interface between them and the input of the flip-flop 69.

The timing diagram of FIG. 10 shows how the low fluctuation clock signal $H_{SF}$ is synthesized by means of the above described circuit. According to the above-mentioned digital example, FIG. 10 shows, first of all, the eight clock phases numbered $H_O$ to $H_7$ shifted by $\bar{n}/4$ and with a period $T_c$, then the signals VAL and IR which appear according to the sequence of the table of FIG. 9, the corresponding values of $q_c$ being shown in brackets, then eight following lines corresponding to the inputs $D_O$ to $B_7$ of the eight sampling flip-flops of the selection circuits, namely those that represent the decoded and delayed addresses of the durations indicated earlier and, finally, the last line representing the synthesized clock signal which is the sequence of samplings in time of the different addresses. The clock signals $H_c$ and $\overline{H}_c$ are naturally two clock signals chosen from among the $2^Q$ phase shifting clock signals. The position of these two complementary clock signals is given by the fact that it is sought to make an absolutely unambiguous address sampling. To provide for proper functioning of the flip-flops, the signal at the input D of each of these flip-flops should be pre-established somewhat before the rising edge of the clock signal and should be still maintained for a while after it. This corresponds, in FIG. 8, to the fact that for the clock signals $H_O$ to $H_3$, the signal at the input D of the corresponding flip-flops should be synchronous with the clock signal $H_6$ and that, for the clock signals $H_4$ to $H_7$, the signal at the input D of the corresponding flip-flop should be synchronous with the clock $H_2$, so as to enable the rising edge of these clocks to be well within the peak to be sampled as can be seen in the timing diagrams of FIG. 10, and especially for the signal $B_2$. To take these two examples into account, $H_c=H_6$ and $H_c=H_2$.

In general, for $2^Q$ phase shifted clock signals, the number of the clock signal $H_C$ will be $2^{3Q}$ and that of the clock signal $H_c$ will be 24.

The result of the above is that it is the phase resolution of the clocks (or the temporal resolution for a given computing clock period) that fixes the phase modulation of the synthesized signal at the output of the device. For example, for a computation clock signal with a frequency of 50 MHz and a generator with 128 clock phases, the temporal resolution is 20 nanoseconds/128, namely 0.16 nanoseconds. The gain in processing obtained with respect to a signal synthesized solely by the computation clock (as an approximate definition) is then 6Q decibels, namely 42 decibels. This gain in processing has the characteristic feature of being non-periodic whether the synthesized frequency is equal to one-fifth or one-hundredth of the clock frequency. This is naturally true to the extent as the bit shifting device in the precise phase computation device has insufficient dynamic range. However, fluctuations in processing gain may appear if the temporal deviation between two clock signals of successive ranks is not obtained with sufficient precision. One of the means used to obtain equally spaced out clocks is to use a shift register consisting of $2^{Q/2}$ cascade-mounted flip-flops, the inverted output of the last flip-flop being connected to the input of the first, all the flip-flops controlled by the same reference clock HR. Thus, a JOHNSON type frequency divider is obtained, also called a loop frequency divider, the division rank of which is $2^Q$. The clock signal HR should, in this case, be $2^Q$ times higher than the computation clock signal $H_c$. As an example, if the computation clock signal $H_c$ has a frequency of 50 MHz and if Q equals 11, the reference clock signal $H_R$ should be set at a frequency of 6.4 GHz.

The phase shifted clock signals generating circuit shown in FIG. 11 avoids this danger. The purpose of this circuit is to prepare and give $2^Q$ clock signals at every period $T_c$, these periods being phase shifted between one another by the quantity $2\pi/2Q$. It consists of blocks 77 to 80, these blocks comprising elements numbered 81 to 122. According to this depiction, a source with a stable frequency of a value $FR=2^B$ times the frequency of the computation clock signal powers a passive device 77 used to obtain C phase shifted signals of $\pi/C$ rad where C is equal to $2^{Q-B}/2$. The C signals obtained are applied to a circuit of symmetrical NO-R.OR gates to obtain 2C signals phase shifted by n/C rad in the interval 0 to 2n and numbered $H_{R0}$ to $H_{R(2C-1)}$. One of these signals is used as a clock signal to a loop divider 79 of a rank $2^B$ which gives, at its $2^B$ outputs signals phase shifted by $2n/2^B$ rad of the same frequency as the clock signal $H_c$. The loop divider 79 is used as a master for $2^B/2$ shift registers known as slaves each comprising $(2^{Q-B}-1)$ stages, the clock signals of which, applied to each of these stages, are given with the (2C-1) remaining signals obtained at the gates of he block 78 and used in an order such that the pre-setting and maintenance time needed for the signal at the input of each flip-flop with respect to the clock considered is maintained. Thus, for each register, there are $2(2^{Q-B}-1)$ additional phase shifted signals created. All the phase shifted signals obtained in the counter and the registers are equal to:

, $2^B+(2^B/2).2(2^{Q-B}-1)=2^Q$.

The slave registers are shown inside the rectangle in dashes 80. The term master used to qualify the loop divider 79 indicates that it is the loop divider that imposed its square-wave shape on the shift registers which are copied by these shift registers and shifted in time.

The elementary phase shift between these signals is equal to that given to the passive phase shifting device n/C divided by the division row $2^B$ giving $2n/2^Q$. The example shown in FIG. 11 as well as the timing diagrams relating to FIG. 12 concern a generator of 64 clock phases (Q=6). For example, this generator can work on a clock frequency $H_c$ of 50 Hz, $H_R$ being equal to 400 MHz and B being equal to 3. Thus, the block 77 gives, from the signal $H_R$, four signals phase-shifted by n/4 by using, for example, four delay lines or by using, as shown in FIG. 11, a four-way distributor 81 followed by four delay lines 82, 83, 84 and 85 with different lengths which can be used to obtain the required phase shifts. Thus, delays equal to 0, 0.31, 0.63 and 0.94 nanoseconds are obtained.

The block 78, which is made up of OR/NOR gates 86, 87, 88, 89, gives, in addition to the above signals, the corresponding signals in phase opposition and, thus, the clocks numbered $H_{R0}$ to $H_{R7}$, shown on the first eight lines of the timing diagram of FIG. 12, are obtained.

The block 79 is formed by a loop divider by 8 comprising four cascade-mounted flip-flops marked 90 to 93, the inverted output of the flip-flop 90 being looped to the input of the flip-flop 93. A divider of this type has two modes of operation, a normal mode used to obtain the square signal sought (division by 8) and an unwanted mode. To eliminate this unwanted mode, an AND gate 94 with two inputs, respectively connected to the normal output of the flip-flop 93 and the additional output of the flip-flop 92, resets the flip-flops 91 and 90. The signal $H_O$, which is synchronous with the clock $H_{R0}$, is shown in the line 9 of the timing diagram of FIG. 12. The other output signals of the divider are deduced from the signal $H_O$ by successive phase shifts equal to a clock time $T_R$ as shown, for example, by the signal $H_8$ coming from the flip-flop 92. The period of the signals $H_O$ and $H_8$ is equal to $T_c$. The block 80 represents the system of flip-flops arranged in matrix form and used to obtain the 56 other phases. The block 80 represents the system of flip-flops arranged in matrix form and used to obtain the 56 other phases. This system consists of four shift registers, a first shift register consisting of the flip-flops 95 to 101, a second shift register consisting of the flip-flops 102 to 108, a third shift register consisting of the flip-flops 109 to 115 and a fourth shift register consisting of the flip-flops 116 to 112. Each of these registers receives, respectively, at its input flip-flops, formed by the flip-flops 95, 102, 109 and 116, the signals given by the outputs of the flip-flops 93, 92, 91 and 90 of the loop divider 79. The seven columns of the system of flip-flops are controlled by the clock signals, $H_{R5}$, $H_{R2}$, $H_{R7}$, $H_{R4}$, $H_{R1}$, $H_{R6}$ and $H_{R3}$. FIG. 12 shows the successive samplings of the signal $H_O$ coming from the flip-flop 93 through the above-mentioned clock signals, the result of which is the clock signals $H_5$, $H_{10}$, $H_{15}$, $H_{20}$, $H_{25}$, $H_{30}$ and $H_{35}$. The sampling conditions of the signal HO by the clock $H_{R5}$ are shown in the line representing the signal $H_5$. These are, firstly, the hold time $t_H$ and the piece of information $H_O$ after sampling by $H_{R5}$ and, secondly, the pre-setting time $t_F$ of the piece of information $H_O$ before sampling by $H_{R5}$.

Here, these times are respectively 0.94 nanoseconds and 1.56 nanoseconds. These times are compatible with the ECL 100K technologies which are currently being developed. Naturally, technological considerations may yet determine the order in which the clocks are arranged on the shift registers, and this could be optimized when routing the clock signals, depending on the number of phases needed for each particular example of the use of the device according to the invention. The last timing diagram of FIG. 12 shows the development of the clock signal $H_{13}$ obtained by sampling of the signal $H_8$ by the clock $H_{R5}$. As above, this is done by done by successively creating the clock signals $H_{18}$, $H_{23}$, $H_{28}$, etc.

The last line of FIG. 12 shows the position in time of the rising edge of the 64 clock phases, $H_0$ to $H_{63}$, covering a period $T_c$. Finally, the table shown in FIG. 13 shows a few characteristic parameters of the assembly as a function of the processing gain when the loop divider divides a reference frequency of 400 MHz by 8, the number of registers being equal to 4.

Naturally the above principles can be generalized for embodiments pertaining to greater or smaller bit lengths to obtain bigger or smaller clock signals depending on requirements laid down by specifications. Since the invention lends itself very easily to modular embodiments, these extensions would give rise to no difficulty whatsoever.

What is claimed is:

1. A method for the digital synthesis of a clock signal, of the type wherein the clock signal to be synthesized is obtained from a phase increment datum $\Delta P$ representing the frequency to be synthesized, comprising the steps of performing, at each period $T_c$ of a computation clock signal, a binary number M modulo addition of each phase increment with the modulo M sum of the phase increments already totalized inside a phase accumulating device with a capacity equal to the binary number M; reading, after each overflow of the capacity of the accumulator device, the remaining residual phase error $P_K$ contained in the accumulating device; generating $2^Q$ clock signals with a period $T_c$, phase-shifted with respect to each other by $T_c/2^Q$; computing, after each overflow, the temporal error $\Delta t_K$ by calculating the ratio $P_K/\Delta P$ between the residual phase error $P_K$ and the phase increment $\Delta P$ per clock period $T_c$; and selecting that clock signal for which the phase shift with respect to the computation clock signal is closest to the computed residual phase.

2. A method according to claim 1 wherein the phase shift closest to the computed residual phase is determined from a rounded value $q_E$ of the temporal error $\Delta t_K$, in delaying this value by a value $2^Q$ representing the period $T_c$ of the computing clock signal where Q is a positive whole number.

3. A method according to claim 2 wherein the ratio between the residual phase error $P_K$ and the phase increment $\Delta P$ is computed by a digital divider circuit of the pipeline type, the stages of which work at the rate of the computing clock signal $T_c$.

4. A method according to claim 3 wherein the phase increment is modulated by an increment representing a frequency modulation.

5. A method according to claim 4 wherein a phase increment representing a phase modulation is added to the content of the accumulating device.

6. A method according to claim 5 wherein each overflow $R_{KM}$ of the capacity of the accumulating device is indicated by the sign of the difference between two successive values of the residual phase error $P_K$.

7. A method according to claim 6 wherein, in phase modulation, the phase increment value $\Delta P_{KM}$ is obtained at each instant of the computing clock signal by addition of the most recent value of the residual phase error to the phase incremental datum $\Delta P$ and by subtraction of the result obtained from the previous value $P_p$ of the residual phase error obtained at the computing clock signal instant preceding the current computing instant.

8. A device for the digital synthesis of a clock signal comprising a generator of $2^Q$ clock signals with a period $T_c$, evenly spaced out in time, two consecutive signals being phase shifted with respect to each other by a quantity $T_c$, a first circuit having a first input coupled to said generator and a second input receiving a phase increment, for making a rough computation of the period of the signal to be synthesized and for determining the residual phase error $P_k$, a second circuit, coupled to said first circuit, for a precise computation of the phase to calculate the ratio $P_k$, and a third circuit for selecting the clock phase coupled to the second circuit and to the generator of the $2^Q$ clock signals to select the clock signal for which the phase shift with respect to the computation clock signal is closest to the computed residual phase.

9. A device according to claim 8 wherein the first circuit has a phase accumulator to totalize the successive phase increments at each period $T_c$ of the computation clock signal and a circuit to give a signal indicating each overflow of the capacity of the accumulator.

10. A device according to claim 9 wherein the second, precise computation circuit has several adder and subtractor circuits, cascade-mounted in a pipeline structure, to compute the phase shifting value closest to the residual phase.

11. A device according to claim 10 wherein the clock phase selection circuit has a clock phase decoder, addressed by the phase shift value $q_c$ coupled to a validation circuit to select one of the two $2^Q$ clock signals corresponding to the phase shift $q_c$ computed to constitute the synthesized clock signals.

12. A device according to claim 11 wherein the generator of the $2^Q$ clock signals has a system of flip-flops arranged in matrix form, each flip-flop giving a clock signal being at the intersection of a line and a column of the matrix organization, each line being coupled to an output among the $2^B$ outputs of a loop divider, clocked at a frequency $F_R = 2^B$ times the frequency of the computation clock signal, and each column being coupled to one of 2C direct complement outputs of a device shifting the phase of the clock signal of the loop divider.

* * * * *